A. BARR & W. STROUD.
FIRE CONTROL APPARATUS.
APPLICATION FILED DEC. 30, 1911.
1,177,470.
Patented Mar. 28, 1916.
5 SHEETS—SHEET 1.
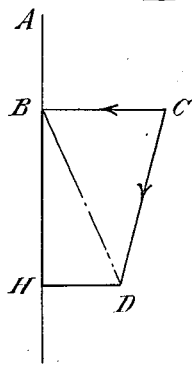
FIG: 1.
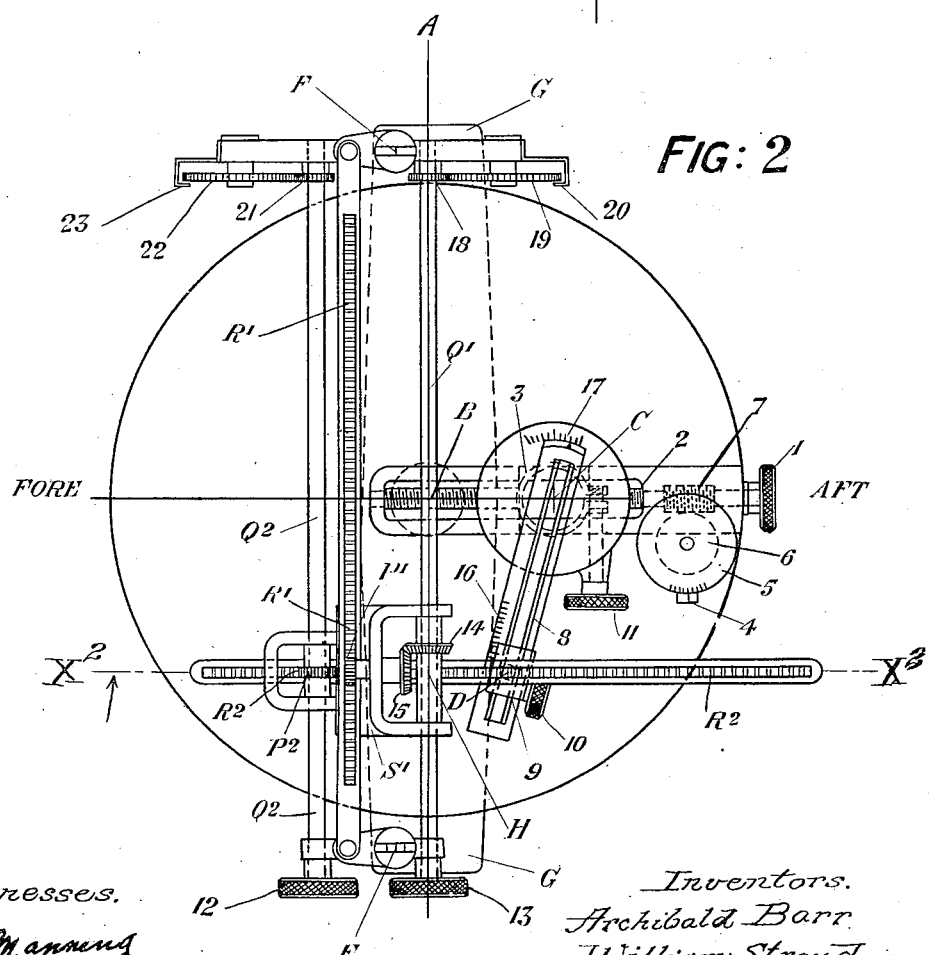
FIG: 2
Witnesses.
G. Manning
M. McCalhan
Inventors.
Archibald Barr
William Stroud
By T. Walter Fowler
Atty.

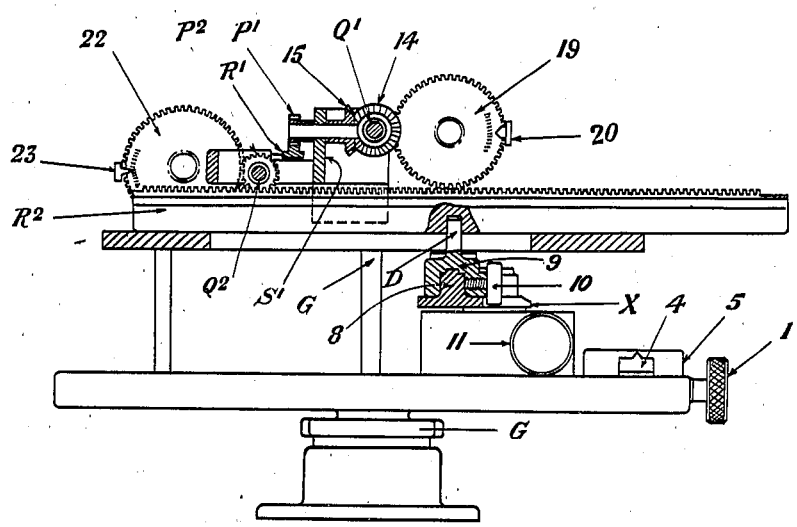
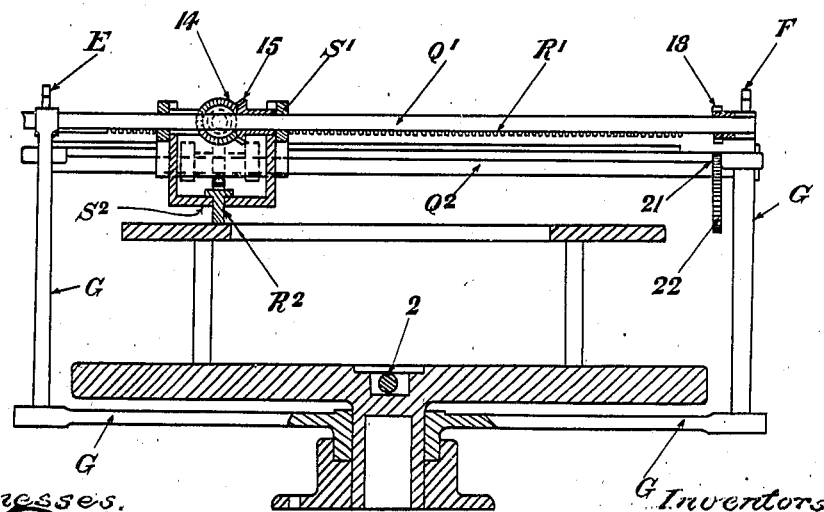

A. BARR & W. STROUD.
FIRE CONTROL APPARATUS.
APPLICATION FILED DEC. 30, 1911.
1,177,470.
Patented Mar. 28, 1916.
5 SHEETS—SHEET 3.
FIG: 4.
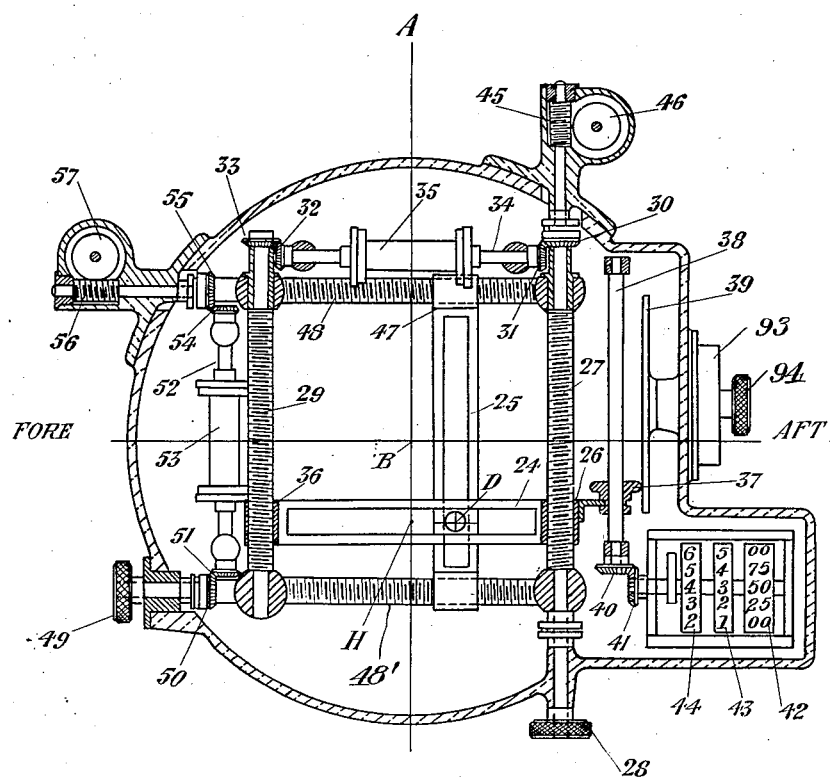
Witnesses.
G. Manning
M. McCalman
Inventors.
Archibald Barr
William Stroud.
By T. Walter Fowler
Atty.

A. BARR & W. STROUD.
FIRE CONTROL APPARATUS.
APPLICATION FILED DEC. 30, 1911.
1,177,470.
Patented Mar. 28, 1916.
5 SHEETS—SHEET 4.
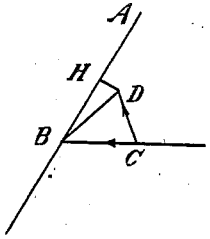
FIG: 5.
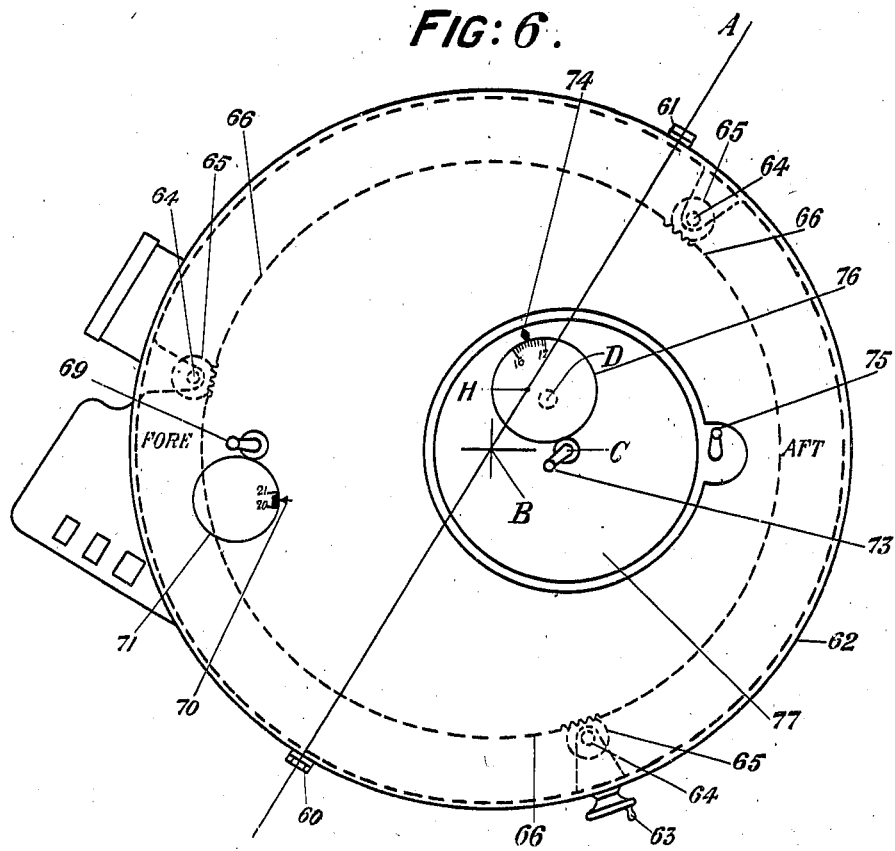
FIG: 6.
Witnesses.
G. Manning
M. McCalthian
Inventors.
Archibald Barr.
William Stroud.
By T. Walter Fowler
Atty.

A. BARR & W. STROUD.
FIRE CONTROL APPARATUS.
APPLICATION FILED DEC. 30, 1911.
1,177,470.
Patented Mar. 28, 1916.
5 SHEETS—SHEET 5.
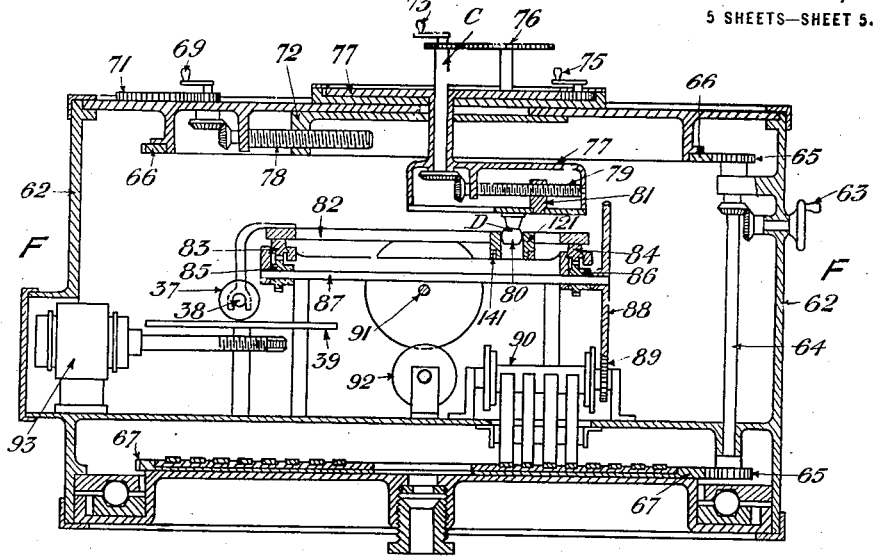
FIG: 7.
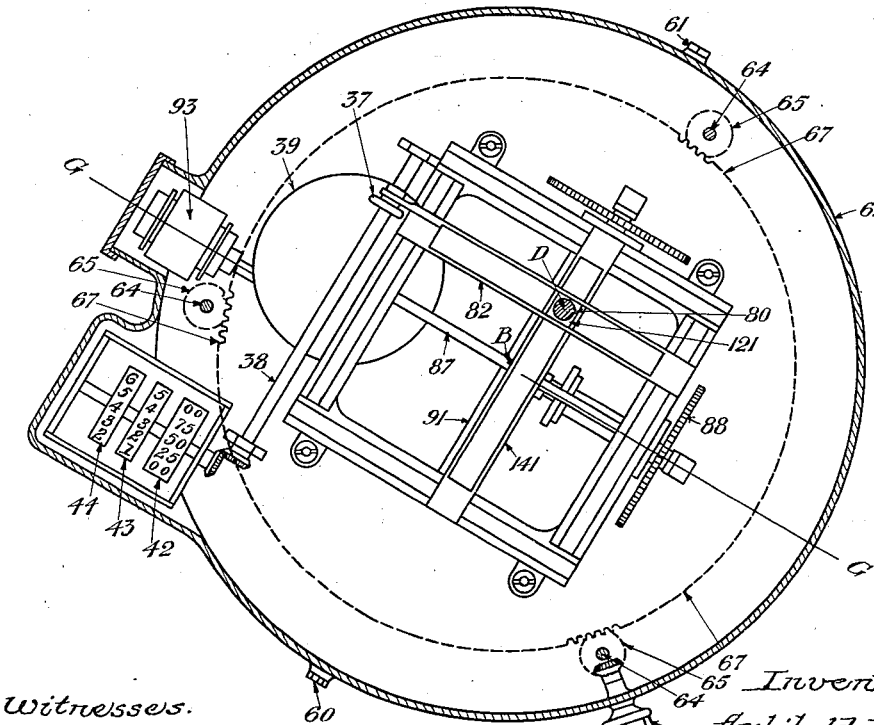
FIG: 8.
Witnesses.
G. Manning
M. McCalhran
Inventors.
Archibald Barr
William Stroud
By T. Walter Fowler
Atty.

UNITED STATES PATENT OFFICE.

ARCHIBALD BARR AND WILLIAM STROUD, OF ANNIESLAND, GLASGOW, SCOTLAND.

FIRE-CONTROL APPARATUS.

1,177,470.     Specification of Letters Patent.     Patented Mar. 28, 1916.

Application filed December 30, 1911. Serial No. 668,799.

*To all whom it may concern:*

Be it known that we, ARCHIBALD BARR and WILLIAM STROUD, subjects of the King of Great Britain and Ireland, and both of Caxton street, Anniesland, Glasgow, Scotland, have invented a new and useful Fire-Control Apparatus, an instrument for indicating range and rate of change of range and for finding the rate of transverse motion of the target, (for which we have made an application for patent in Great Britain, No. 1,510, bearing date January 20, 1911,) of which the following is a specification.

The object of our invention is to provide an instrument capable of readily indicating the rate of change of range and the rate of transverse motion of the target when the direction and velocity of our own ship hereinafter generally referred to as the observing ship are known, and the direction and velocity of the target are either known or are capable of estimation, and further, assuming the range known at any time, to provide means for indicating the value of the actual range of the target at later times.

We are aware that apparatus has already been devised for attaining the same general results as those which we accomplish by our invention, but this has been done by apparatus differing in principle of construction and method of operation from that which forms the subject of our invention.

In addition to securing the results attained by apparatus such as has already been devised, our present invention possesses the advantage that the act of sighting upon the target mechanically determines the rate of transverse motion of the target and the rate of change of range at once. Further, the mechanism may be so arranged that the results of the observations may be automatically transmitted to a distance, and lastly the mechanism for measuring the magnitude of the rate of change of range may be associated in construction with means for automatically furnishing the value of the total change of range, or if the initial range be known, the actual ranges at later times.

This invention will be described with reference to the accompanying drawings, in which:—

Figure 1 is a diagram representing the velocities of the observing ship and that of the target and the components of the relative velocities it is desired to indicate and transmit to a distance. Fig. 2 is a plan of the interior parts of one form of an instrument constructed in accordance with our invention. The position in which the parts are shown corresponds to that of the lines in the velocity diagram Fig. 1, but the casing in which the mechanism is carried is omitted to gave a clearer view of said mechanism. Fig. 3 is an elevation partly in section taken about the line $X^2$—$X^2$ of Fig. 2, looking in the direction of the arrow. Fig. $3^A$ is an elevation partly in section taken about the line A—B of Fig. 2, looking from the right toward the left. Fig. 4 is a plan of a modified form of instrument, the casing being shown in section and the section being taken below a sight bar hereinafter mentioned. Fig. 5 is the velocity diagram corresponding to the modified form of apparatus, shown in Figs. 6, 7 and 8. Fig. 6 is a plan of the outside seen from above, Fig. 7 is a sectional elevation approximately about the line G G of Fig. 8, and Fig. 8 is a plan of the lower part of the mechanism the case being sectioned at about the level F F of Fig. 7.

An explanation of the known principle upon which this invention is based will now be given with reference to the diagram shown at Fig. 1 of the drawings, in which:— B represents a vertical axis fixed relatively to the observing ship on which the instrument is mounted, BA represents a line of sight to be turned about the axis B as center. C represents a point capable of being adjusted along a line intersecting the axis B and parallel to the direction of travel of the observing ship, so that the distance CB may be set to represent the velocity of the observing ship in magnitude and the line CB represent the direction of travel of the observing ship. D represents a point capable of being turned about C as a center and adjusted so that the line CD may be set parallel to the direction of motion of the target and the distance CD set to represent the velocity of the target. The speed of the target and its direction of travel may be determined or estimated in any way. In use, with the points C and D, set and fixed relatively to the observing ship, assuming that the target and the observing ship each maintains its speed and direction, if the line of sight BA, which always passes through the axis B is kept directed upon the target, the rate of change of range is determined by the resolved component BH of the line BD along the line of sight BA, and the rate of transverse motion of the target, which is perpendicular to the line of sight BA, is determined by the resolved component DH of the line BD perpendicular to the line of sight. The speed of the observing ship, as set off by the distance of C from B, and the speed of the target, as set off by the distance of D from C, and the direction of motion of the target, as indicated by the position of D relatively to C, are adjusted from time to time as changes in these are observed. It will thus be recognized that for practical purposes the values of the components BH and DH are capable of being readily and accurately determined. In apparatus of the type already known this has been done by means of ocular observations taken on the lines BA and DH. Thus given the velocity and direction of the observing ship and that of the target, we have two points B and D upon a surface approximately horizontal, and the primary object of this invention is to mechanically determine the projections BH, DH of the line BD along and perpendicular to the line of sight through B.

In the examples of construction illustrated, the operation of keeping the line of sight BA directed upon the target, brings the mechanism provided into action and causes rotary motions to be imparted to shafts, the amounts of rotation of which indicate, one the rate of change of range and the other the rate of transverse motion of the target. The rotation of these shafts may be used to operate indicators for giving the values of BH and DH; they may be used to operate mechanism for automatically transmitting to a distance the values of the resolved components BH and DH, or either of them; a shaft rotated in accordance with change of range BH may be associated in construction with means for automatically furnishing the value of the total change of range, or if the initial range be known, the actual range at later times.

In Fig. 2 (for which, as stated, Fig. 1 is the velocity diagram) the instrument is placed with the line BC in the fore and aft direction of the observing ship and the position of the point C is adjusted with reference to B so that CB indicates the speed of the observing ship. This is accomplished by turning the head 1 which rotates a screw 2 carrying a nut 3 upon which is mounted a pivot C, the vertical axis of which will also be designated C and in further reference implied except where otherwise qualified. The length of CB (and, therefore, the speed of the observing ship) is indicated by the position of the fixed pointer 4 upon the dial 5 attached to the worm wheel 6 which is operated by the head 1 through the worm 7.

The direction of motion of the target (CD Fig. 1) is set off in the following way:—8 is a slotted bar pivoted at C carrying a slider 9 from which the pin D projects upward. The vertical axis of the pin D will also be designated D and in further reference implied except where otherwise qualified. By means of the two clamps 10 and 11 the pin D shown dotted in Fig. 2 as in this case it lies below part $R^2$, and shown in elevation in Fig. 3, may be rigidly fixed relative to the base of the instrument which again is fixed relatively to the observing ship, but on releasing both these clamps the pin D may be moved to or from C or around C by manipulating the heads 12 and 13. The head 12 is mounted on the rod $Q^2$ on which is feathered a pinion wheel $P^2$ gearing in the rack $R^2$ pivoted on the pin D, the connection permitting the rack $R^2$ to turn freely about the pin D. Similarly, the head 13 is fixed to a rod $Q^1$ upon which is feathered a bevel wheel 14 gearing into a bevel wheel 15 to which is fixed the pinion wheel $P^1$ gearing in the rack $R^1$. This rack $R^1$ is incapable of translation. The two racks $R^1$ and $R^2$ are kept always perpendicular to each other by being mounted in a piece containing two slides $S^1$ $S^2$ at right angles to each other. Thus, when the pin D is free, the head 12 and the pinion $P^2$ may be rotated whereby the rack $R^2$ is moved endwise carrying the pin D in the fore and aft direction. By rotating the head 13 the pinion wheel $P^1$ is rotated upon the rack $R^1$ which is incapable of translation so that $P^1$ moves forward or backward upon $R^1$ carrying the rack $R^2$ and pin D with it. Thus by manipulating the heads 12 and 13 the pin D may be placed in any position with reference to C until the line CD represents the speed of the target as read off on the scale 16 and the direction as set off upon the scale 17. The pin D is now clamped in position by means of 10 and 11 and the axes B, C and D then remain fixed relatively to the observing ship, after which the sight-bar EF parallel to BA is turned around so as to look in the direction of the target, so that when properly directed the position of the point H on the line BA is automatically determined and any subsequent variation in the direction of the line of sight is accompanied by a variation of the component BH and necessitates a corresponding travel of $P^1$ along its rack $R^1$ and any variation of DH necessitates a corresponding travel of the pinion $P^2$ along its rack $R^2$ each of the pinions producing a rotation of its associated shaft $Q^1$ or $Q^2$, each of which consequently indicates the magnitude of the respective alterations occurring. The sight-bar EF (of which E is the back-sight and F the fore-sight) is mounted upon a frame G (which also carries the guides $S^1$ $S^2$, the rods $Q^1$ $Q^2$ and associated parts) all of which are capable of being rotated together about the vertical axis B when the pin D is fixed. As seen at Fig. 3$^A$ the frame G, is mounted to turn about a pivot G$^1$, the axis of which is the vertical axis B. The frame G with the sight bar and other parts may either be turned by hand directly or more slowly by the manipulation of 12 and 13. The resolved components BH and DH of the velocity CD parallel to, and at right angles to the line of sight are now represented by the position of P$^1$ upon the rack R$^1$ and by the position of P$^2$ upon the rack R$^2$ respectively. We next provide means for indicating the positions of these pinion wheels upon their respective racks. The position of P$^1$ is indicated by the revolutions of the rod Q$^1$ to which is attached a pinion 18 gearing into a wheel 19 with a uniform scale upon its face. The fixed pointer 20 enables the rate of change of range or value of the component BH to be read off. Similarly the position of P$^2$ is indicated by the revolutions of the rod Q$^2$ to which is attached a pinion 21 gearing into a wheel 22 with a uniform scale upon its face. The fixed pointer 23 enables the differential velocity of the observing ship and the target at right angles to the line of sight or value of the component DH to be read off.

Fig. 4 shows in plan a modified arrangement (for which Fig. 1 is again the velocity diagram) according to this invention and in addition to the indicators shown in Fig. 2 there is represented means for integrating the product of the rate of change of range and time. BA as before represents the line of sight or, in other words, the sight bar is parallel to BA. In this case the equivalent of a sight-bar is conveniently formed by providing a fore-sight and a back-sight similar to E and F of Fig. 2, on the upper part of the case which is cut away in this view. The pin D corresponds to the similar pin in Fig. 2 and its position may be adjusted by means similar to those described in connection with Fig. 2. Thus the parts 1 to 11, 16, 17 and pin C shown on Fig. 2 may be used in this modification for the purposes described. The resolved components BH and DH of BD along and perpendicular to the line of sight are here measured directly by screw mechanisms which also work transmitters whereby the results may be telegraphed to receivers at a distant station. Surrounding the pin D are two slotted pieces 24 and 25, the distance of 24 from B measuring the rate of change of range represented by the component BH and the distance of 25 from B rate of transverse motion of the target represented by the component DH. In the first instance we shall consider the measurement of the rate of change of range. The slotted piece 24 is carried upon a nut 26 which is translated by the screw 27 operated by the head 28. In order to guide the slotted piece 24 steadily, the rotations of the screw 27 are transmitted to the screw 29 by two sets of bevel gearings 30, 31 and 32, 33 operating through a shaft 34 supporting the commutator 35 of a transmitting apparatus. Upon the screw 29 is a nut 36 attached to the left hand end of the slotted piece 24. Forked into the piece 24 is a friction wheel 37 mounted on a shaft 38 upon which it is feathered. A uniformly rotating friction disk 39 driven for example by clockwork contained in the case, 93, and wound up by the head, 94 presses against the friction wheel 37 thereby causing it to rotate at a rate depending upon the distance of 37 from the center of the friction disk 39. The position of this center is such that when the friction disk is there BD is perpendicular to the line of sight BA. Through bevel gearing 40, 41 the revolutions of the shaft 38 are transmitted to the carry over drums 42, 43, 44, indicating ranges. These drums besides being driven by the friction gear, 37, 39 may be so arranged as to be also readily rotatable by hand in such a way that the initial range (as given by the rangefinder e. g.) may be immediately set upon the drums, when, if the pin D has been correctly placed and the line of sight has been kept continuously upon the target, the range as given by the reading of the drums should keep in conformity with the measured range. The carry-over mechanism between the drums, 42 and 43, and the drums 43 and 44 is not shown. The arrangement may be similar to that commonly used in counting mechanism. Apertures similar to those shown in Fig. 6 may be provided in the cover over the drums to exhibit only one line of numbers on the drums. Conversely by shifting the pin D until the readings of the drums keep in conformity with the measured range we are able to locate the position of D more accurately. The actual value of the rate of change of range may be read off at the instrument say by attaching to the shaft 27 a worm 45 gearing into a worm wheel 46 upon which a circular scale, with a fixed pointer, is mounted.

The arrangements for measuring, indicating and transmitting the rate of transverse motion of the target are precisely similar to those described in connection with rate of change of range. The slotted piece 25, say below the piece 24 is attached to a nut 47 operated by a screw 48 by means of the head 49 through bevel gearing 50, 51, shaft 52 (carrying commutator 53) and bevel gearings 54, 55. In order to guide the slotted piece, 25, steadily a drive is applied to its end opposite to 47 and similar to that applied thereto, by means of a screwed extension, 48', of the shaft to which the head, 49, is fixed. The rate of transverse motion of the target may be read off by worm 56 (attached to screw 48) and worm wheel 57 carrying a circular scale just as described in connection with 45 and 46. It will be recognized that the screws, 27, 29 and 48, 48¹, may be of appropriately quick pitch to permit rotational motion to be imparted to them when the sight bar is turned by the forces transmitted from the slotted pieces, 24 and 25 bearing against the fixed pin, D. The transmitters and receivers referred to may conveniently be of the type described in the applicants' earlier Patent No. 1009013, but transmitters and receivers of other types may be used in connection with the apparatus. The commutators 35 and 53 may be of any appropriate rotary type, for example they may be of the rotary cylindrical kind as disclosed with reference to Figs. 9 to 12 of applicants' aforesaid Patent No. 1,009,013.

In the modified form of apparatus shown in Figs. 6, 7 and 8 (for which as stated, Fig. 5 is the velocity diagram) 60, 61 is the sight bar parallel to BA, Fig. 5 and coincident with BA Fig. 6. This sight bar is mounted upon the drum portion of a casing 62, and can be rotated by the handle 63 about the vertical axis B, so as to be kept continuously directed upon the target. Attached to this casing 62 are the bearings of (say) three sets of shafts 64, carrying equal pinions 65 fixed to the shafts. These pinions gear into large toothed wheels 66 and 67 (see Figs. 7 and 8). The wheel 67 is fixed to the stand of the apparatus so that in this way the wheel 66 is maintained in such a way that it does not rotate with the casing 62. Thus this wheel 66 and all parts that it supports, after the initial settings of the parts have been made, remain fixed relatively to the observing ship, and do not rotate when the sight bar is turned about the vertical axis B. To set off the velocity of the observing ship a handle 69 is turned which causes an index dial 71 and a screw 78 to be rotated. As shown at Fig. 7, the screw in rotating moves a frame 72 in the fore and aft direction and C (which is represented by the axis of a shaft, having a handle 73, mounted to rotate in a bearing upon the frame 72) can thus be set at the required distance from the vertical axis B, the pointer 70 indicating upon the dial 71 the velocity BC required (say 20.4). To set off the speed of the target the handle 73 is turned which causes a screw 79 and an index dial 76, both mounted upon a frame 77, to be rotated. As shown at Fig. 7, a pin 80 (the center of which represents the vertical axis D) is attached to a nut 81 which is mounted upon the screw 79 so that as the screw 79 is rotated the pin 80 or axis D is moved toward or away from C and the speed DC (say 16.5) is indicated upon the dial by the pointer 74, see Fig. 6. In Fig. 7 the parts 73 and 76 are represented for clearness as standing at some height above the apparatus. In the actual apparatus as constructed, the plate 76 would lie close above 77. To set off the direction of motion of the target a handle 75 is turned which causes the frame 77, the screw 79, pin D and pointer 74 to turn about C, so that the line joining C and the pointer 74, or in other words, the line CD, can thereby be set parallel to the direction of motion of the target. We have in the next place to indicate and record the projection of the line BD, Fig. 5 along and perpendicular to the line of sight. This will be understood from Fig. 8. The pin 80 is embraced by a square or rectangular piece 121 which engages in two slotted bars 82 and 141. The slotted bar 82 (see Fig. 7) carries two racks 83, 84, engaging with pinions 85 and 86 fixed on a shaft 87, carrying a toothed wheel 88 gearing into a pinion 89 to which the commutator 90 of a transmitting apparatus is attached when it is desired to transmit the indications to a distance. If, however, it were desired to indicate at the instrument itself the shaft 87 might have been prolonged outside the casing 62, and a counting or indicating mechanism attached to it. In a similar manner the slotted bar 141 communicates its motion by means of racks and pinions to the shaft 91 which can be arranged to indicate the rate of transverse motion of the target either at the instrument by means of an indicating mechanism, or counter, or at a distance by means of a commutator 92 of a transmitting apparatus. To comprehend the method of working it must be understood that the pin 80 is fixed (after setting) and as the drum casing 62 is rotated so as to keep the line of sight 60, 61 upon the target the slotted bars 82 and 141 bear against the pin 80 and are thereby caused to move and produce a rotation of the shafts 87 and 91, whose motions indicate the rate of change of range and the rate of transverse motion of the target respectively.

The stationary portion of the frame 67 (Fig. 7) is shown carrying eight insulating rings, two of these are connected to the + and − terminals of a supply of E. M. F., the remaining six are in two sets of three for use in connection with the two commutators 90 and 92.

On the left of Figs. 7 and 8 is shown a constant speed motor 93 supplied with current from the + and − rings on the frame 67, driving a friction disk 39, say, by means of a worm and worm wheel. The description of the corresponding parts in Fig. 4 applies to the case of Figs. 7 and 8.

In the claims the rack R¹ of Fig. 2, the frame 25 of Fig. 4 and the frame 141 of Fig. 13

8, or equivalent parts which could be substituted therefor will generally be termed the longitudinal bar, and the rack $R^2$ of Fig. 2, the frame 24 of Fig. 4 and the frame 82 of Fig. 8, or equivalent parts which could be substituted therefor will generally be termed the transverse bar, and for purposes of definition it may be assumed that the bars are without breadth.

We claim:—

1. Apparatus for use in fire control having a fixed base, a vertical axis B fixed relatively to the base, a sight bar mounted on the base capable of rotation about the center B, a part mounted upon the base about a vertical axis C and so supported that the distance CB may be adjusted to represent on a chosen scale the speed and direction of motion of the home ship, a part mounted upon the base about a vertical axis D adjustable relatively to C, so that CD may be set to represent on the chosen scale the speed and direction of motion of the target, a longitudinal bar maintained parallel to the line of sight, a transverse bar maintained at right angles to the line of sight, the longitudinal and transverse bars being mounted to turn with the sight bar, means for causing the transverse bar to intersect the axis D at all times, and means for indicating the distance between D and the point where the line of sight through B intersects the transverse bar, together with means for indicating the distance between the vertical axis B and the transverse bar, for the purposes set forth.

2. Apparatus for use in fire control having a fixed base, a sight bar mounted on the base capable of rotation about a vertical axis B fixed relatively to the base, a part mounted upon the base about a vertical axis C and so supported that the distance CB may be adjusted to represent on a chosen scale the speed and direction of motion of the observing ship, a part mounted upon the base about a vertical axis D adjustable relatively to C, so that CD may be set to represent on the chosen scale the speed and direction of motion of the target, a longitudinal bar maintained parallel to the line of sight, a transverse bar maintained at right angles to the line of sight, the longitudinal and transverse bars being so mounted as, at all times, to intersect in the axis D and each capable of moving in a direction perpendicular to its length toward or away from the axis B and turning with the sight bar, with means for indicating the distances of the longitudinal bar and the transverse bar from the axis B respectively, for the purposes set forth.

3. Apparatus for use in fire control having a fixed base, a center B on the base, a sight bar mounted on the base capable of rotation about a vertical axis B fixed relatively to the base, a part mounted upon the base about a vertical axis C and so supported that the distance CB may be adjusted to represent on a chosen scale the speed and direction of motion of the observing ship, a part mounted upon the base about a vertical axis D adjustable relatively to C, so that CD may be set to represent on the chosen scale the speed and direction of motion of the target, a longitudinal bar maintained parallel to the line of sight, a transverse bar maintained at right angles to the line of sight, the longitudinal and transverse bars being mounted to turn with the sight bar, means for causing the transverse bar to intersect the axis D at all times, and means for indicating the distance between D and the point where the line of sight intersects the transverse bar, together with means for indicating the distance between the vertical axis B and the transverse bar, a friction disk, means for uniformly rotating the friction disk, a friction wheel carried by the transverse bar and arranged to move along a diameter of the face of the friction disk, for the purposes set forth.

4. Apparatus for use in fire control having a fixed base, a sight bar mounted on the base capable of rotation about a vertical axis B fixed relatively to the base, a part mounted upon the base about a vertical axis C and so supported that the distance CB may be adjusted to represent on a chosen scale the speed and direction of motion of the observing ship, a part mounted upon the base about a vertical axis D adjustable relatively to C, so that CD may be set to represent on the chosen scale the speed and direction of motion of the target, a longitudinal bar maintained parallel to the line of sight, a transverse bar maintained at right angles to the line of sight, the longitudinal and transverse bars being so mounted as, at all times, to intersect in the axis D and each capable of moving in a direction perpendicular to its length toward or away from the vertical axis B and turning with the sight bar, a the friction disk, a friction wheel carried by the transverse bar and arranged to move along a diameter of the face of the friction disk, for the purposes set forth.

5. Apparatus for use in fire control having a fixed base, a sight bar mounted on the base capable of rotation about a vertical axis B fixed relatively to the base, a part mounted upon the base about a vertical axis C and so supported that the distance CB may be adjusted to represent on a chosen scale the speed and direction of motion of the observing ship, a part mounted upon the base about a vertical axis D adjustable relatively to C, so that CD may be set to represent on the chosen scale the speed and direction of motion of the target, a longitudinal bar maintained parallel to the line of sight, a transverse bar maintained at right angles to the line of sight, the longitudinal and transverse bars being so mounted as, at all times, to intersect in the axis D and each capable of moving in a direction perpendicular to its length toward or away from the vertical axis B and turning with the sight bar, with means for indicating the distances of the longitudinal bar and the transverse bar from the axis B respectively, a friction disk, means for uniformly rotating the friction disk, a friction wheel carried by the transverse bar and arranged to move along a diameter of the face of the friction disk, for the purposes set forth.

6. Apparatus for use in fire control having a fixed base, a sight bar mounted on the base capable of rotation about a vertical axis B fixed relatively to the base, a part mounted upon the base about a vertical axis C and so supported that the distance CB may be adjusted to represent on a chosen scale the speed and direction of motion of the observing ship, a part mounted upon the base about a vertical axis D adjustable relatively to C, so that CD may be set to represent on the chosen scale the speed and direction of motion of the target, a longitudinal bar maintained parallel to the line of sight, a transverse bar maintained at right angles to the line of sight, the longitudinal and transverse bars being mounted to turn with the sight bar, means for causing the transverse bar to intersect the axis D at all times, a shaft and means for rotating it in conformity with the variations in the distance between D and where the line of sight intersects the transverse bar, together with a second shaft and means for rotating it in conformity with the variations in the distance between the vertical axis B and the transverse bar, for the purposes set forth.

7. Apparatus for use in fire control having a fixed base, a sight bar mounted on the base capable of rotation about a vertical axis B fixed relatively to the base, a part mounted upon the base about a vertical axis C and so supported that the distance CB may be adjusted to represent on a chosen scale the speed and direction of motion of the observing ship, a part mounted upon the base about a vertical axis D adjustable relatively to C, so that CD may be set to represent on the chosen scale the speed and direction of motion of the target, a longitudinal bar maintained parallel to the line of sight, a transverse bar maintained at right angles to the line of sight, the longitudinal and transverse bars being so mounted as, at all times, to intersect in the axis D and each capable of moving in a direction perpendicular to its length toward or away from the vertical axis B and turning with the sight bar, a shaft and means for rotating it in conformity with the variations in the distance between the longitudinal bar and the axis B, and a second shaft and means for rotating it in conformity with the variations in the distance between the transverse bar and the center B, for the purposes set forth.

8. Apparatus for use in fire control having a fixed base, a sight bar mounted on the base capable of rotation about a vertical axis B fixed relatively to the base, a part mounted upon the base about a vertical axis C and so supported that the distance CB may be adjusted to represent on a chosen scale the speed and direction of motion of the observing ship, a part mounted upon the base about a vertical axis D adjustable relatively to C, so that CD may be set to represent on the chosen scale the speed and direction of motion of the target, a longitudinal bar maintained parallel to the line of sight, a transverse bar maintained at right angles to the line of sight, the longitudinal and transverse bars being so mounted as, at all times, to intersect in the axis D and each capable of moving in a direction perpendicular to its length toward or away from the vertical axis B and turning with the sight bar, a shaft and means for rotating it in conformity with the variations in the distance between the longitudinal bar and the center B, the commutator of a transmitter mounted on or driven by the said shaft, and a second shaft and means for rotating it in conformity with the variations in the distance between the transverse bar and the center B, the commutator of a transmitter mounted on or driven by the said shaft, for the purposes set forth.

9. Apparatus for use in fire control having a fixed base, a sight bar mounted on the base capable of rotation about a vertical axis B fixed relatively to the base, a part mounted upon the base about a vertical axis C and so supported that the distance CB may be adjusted to represent on a chosen scale the speed and direction of motion of the observing ship, a part mounted upon the base about a vertical axis D adjustable relatively to C, so that CD may be set to represent on the chosen scale the speed and direction of motion of the target, a longitudinal bar maintained parallel to the line of sight, a transverse bar maintained at right angles to the line of sight, the longitudinal and transverse bars being so mounted as, at all times, to intersect in the axis D and each capable of moving in a direction perpendicular to its length toward or away from the vertical axis B and turning with the sight bar, a shaft and means for rotating it in conformity with the variations in the distance between the longitudinal bar and the axis B, and a second shaft and means for rotating it in conformity with the variations in the distance between the transverse bar and the vertical axis B, a friction disk, means for uniformly rotating the friction disk, a friction wheel carried by the transverse bar and arranged to move along a diameter of the face of the friction disk, for the purposes set forth.

10. Apparatus for use in fire control having a fixed base, a sight bar mounted on the base capable of rotation about a vertical axis B fixed relatively to the base, a part mounted upon the base about a vertical axis C and so supported that the distance CB may be adjusted to represent on a chosen scale the speed and direction of motion of the observing ship, a part mounted upon the base about a vertical axis D adjustable relatively to C, so that CD may be set to represent on the chosen scale the speed and direction of motion of the target, a longitudinal bar maintained parallel to the line of sight, a transverse bar maintained at right angles to the line of sight, the longitudinal and transverse bars being so mounted, as, at all times, to intersect the axis D and each capable of moving in a direction perpendicular to its length toward or away from the vertical axis B and turning with the sight bar, a shaft and means for rotating it in conformity with the variations in the distance between the longitudinal bar and the axis B, the commutator of a transmitter mounted on or driven by the said shaft, and a second shaft and means for rotating it in conformity with the variations in the distance between the transverse bar and the vertical axis B, the commutator of a transmitter mounted on or driven by the said shaft, a friction disk, means for uniformly rotating the friction disk, a friction wheel carried by the transverse bar and arranged to move across a diameter of the face of the friction disk, for the purposes set forth.

11. Apparatus for use in fire control having a fixed base, a sight bar mounted on the base capable of rotation about a vertical axis B fixed relatively to the base, a part mounted upon the base about a vertical axis C and so supported that the distance CB may be adjusted to represent on a chosen scale the speed and direction of motion of the observing ship, a part mounted upon the base about a vertical axis D adjustable relatively to C, so that CD may be set to represent on the chosen scale the speed and direction of motion of the target, a longitudinal bar maintained parallel to the line of sight, a transverse bar maintained at right angles to the line of sight, the longitudinal and transverse bars being so mounted as, at all times, to intersect in the axis D and each capable of moving freely in a direction perpendicular to its length toward or away from the vertical axis B and turning with the sight bar, the longitudinal and transverse bars each being arranged to bear perpendicularly to its length against the part of which D is the axis, for the purposes set forth.

In testimony whereof we affix our signatures in presence of two witnesses.

ARCHIBALD BARR.
WILLIAM STROUD.

Witnesses:
O. U. PORTER,
HAROLD D. JACKSON.